No. 780,480. PATENTED JAN. 17, 1905.
J. C. CRABILL.
CLUTCH.
APPLICATION FILED OCT. 23, 1901.

2 SHEETS—SHEET 1.

Witnesses
Edwin G. Shakle
Geo. Ackman

Jacob C. Crabill, Inventor
By Victor J. Evans, Attorney

No. 780,480. PATENTED JAN. 17, 1905.
J. C. CRABILL.
CLUTCH.
APPLICATION FILED OCT. 23, 1901.
2 SHEETS—SHEET 2.
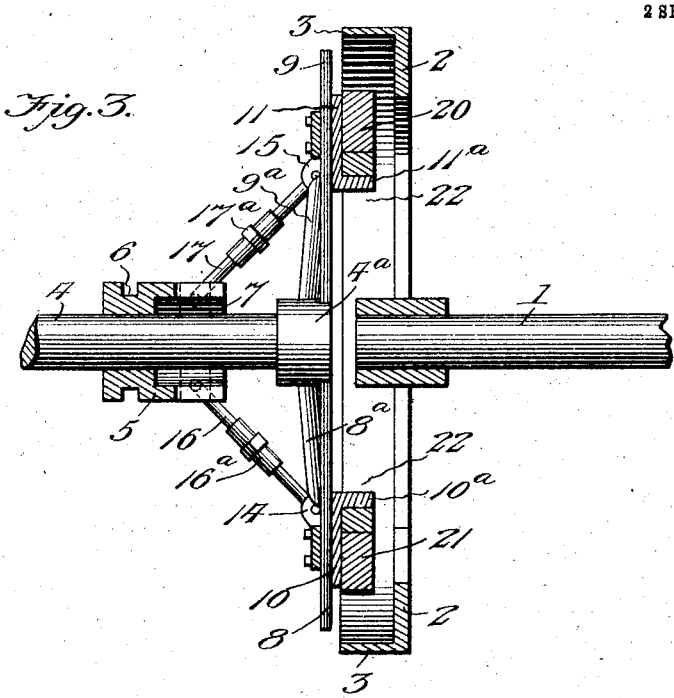
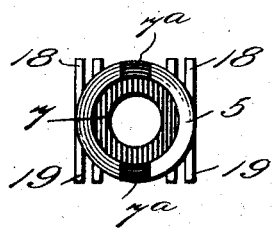
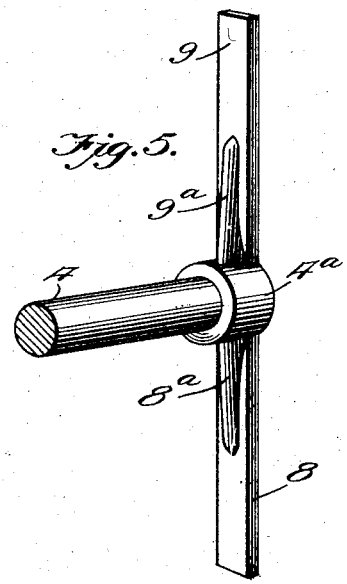
Witnesses
Inventor
Jacob C. Crabill
By Victor J. Evans
Attorney No. 780,480.

Patented January 17, 1905.

UNITED STATES PATENT OFFICE.

JACOB C. CRABILL, OF HARTFORD CITY, INDIANA.

CLUTCH.

SPECIFICATION forming part of Letters Patent No. 780,480, dated January 17, 1905.

Application filed October 23, 1901. Serial No. 79,733.

*To all whom it may concern:*

Be it known that I, JACOB C. CRABILL, a citizen of the United States, residing at Hartford City, in the county of Blackford and State of Indiana, have invented new and useful Improvements in Clutches, of which the following is a specification.

My invention has relation to new and useful improvements in clutches employed to connect a driving member to a driven member in order that the latter may have rotary motion transmitted thereto, and more especially to clutches of that character or type including in their structure radially-movable shoes mounted on a member and arranged to frictionally engage and coact with a surface on a member opposite to the one on which they are mounted to operatively connect said members, so that one may transmit motion to the other.

The objects of the present invention are to provide a clutch of the character mentioned which is simple and durable in construction and which will surely and efficiently attain the objects and purposes for which it is devised.

The invention consists in the improved construction of the various elements and their arrangement and aggroupment in operative combination, to be fully described hereinafter, and the novelty of which will be particularly pointed out and distinctly claimed.

I have fully and clearly illustrated my invention in the accompanying drawings, forming a part of this specification, and wherein—

Figure 1:
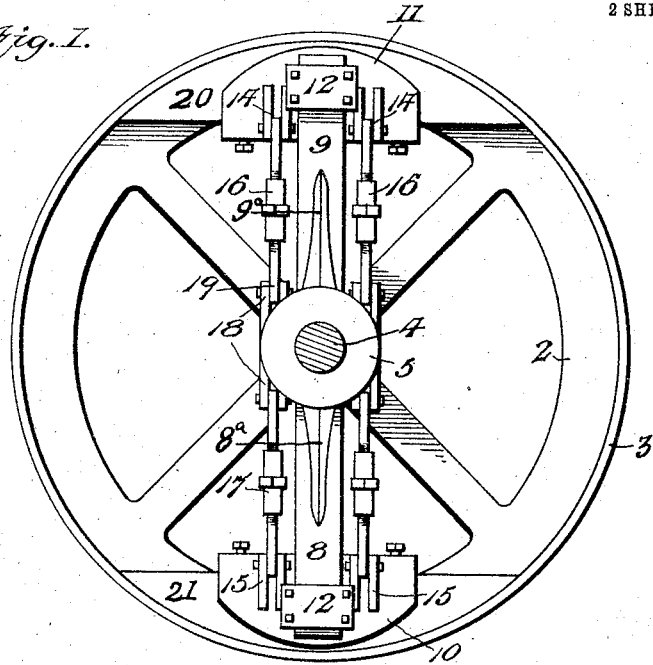
Figure 2:
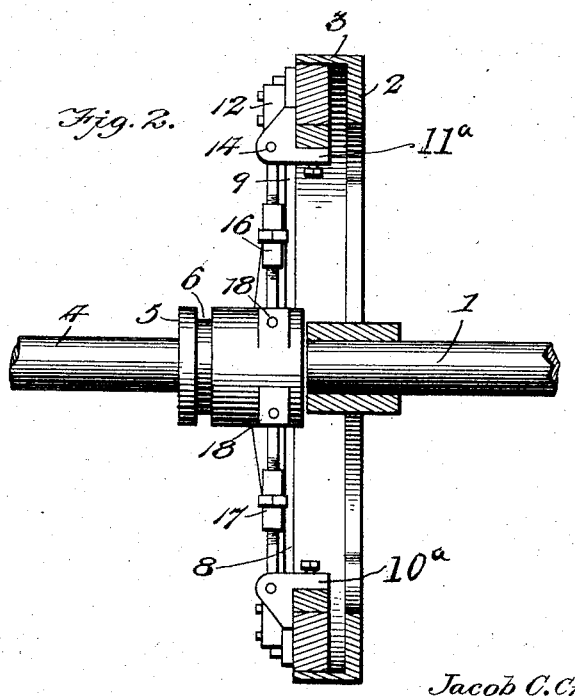

Figure 1 is a rear view in elevation of a clutch structure embodying my invention, the shoes being extended in position to lock the clutch-carrying or driven shaft to a driving-shaft. Fig. 2 is a vertical central longitudinal view of the clutch, the driven shaft and the clutch-hub being shown in side elevation, the shoes being extended into operative position. Fig. 3 is a vertical central longitudinal section through the complete device, showing the shoes in retracted position to disconnect the driven from the driving shaft. Fig. 4 is a detail view, in front elevation, of the clutch-operating hub. Fig. 5 is a detailed perspective view of a portion of the driven shaft and the radial arms thereon upon which the oppositely-disposed shoes of the clutch are mounted and operate.

Referring to the drawings, 1 designates a driving-shaft journaled in suitable bearings (not shown) and to which rotary motion is continuously transmitted from a motor in any well-known manner. Upon one end of this shaft is rigidly mounted a hub carrying a pulley or drive-wheel 2, which is provided at its rim with a laterally-projecting circumferential flange 3 of the proper width, the inner face of which constitutes the face with which the clutch, to be hereinafter described, engages to operatively connect the driven to the driving shaft in order that motion may be transmitted from said driving to the driven shaft.

Oppositely disposed to the driving-shaft 1 and in longitudinal alinement therewith is a shaft 4, which derives its motion from shaft 1 when connected thereto, the ends of the said shafts terminating, as shown in Figs. 2 and 3, closely adjacent each other, but separated a slight distance, so as not to frictionally engage with detrimental results when the driving-shaft is running and the driven shaft is stationary. Rigidly mounted upon this shaft 4 is a sleeve or hub $4^a$, from which project oppositely-disposed radial arms 8 9, comprising flat members the outer ends of which terminate a slight distance short of the flange 3 of the wheel 2, carried by the driving-shaft. These arms 8 and 9 are rigidly mounted on the hub $4^a$ and are braced and strengthened in their position by means of flanges $8^a$ $9^a$, formed integral with the hub and arms and extending longitudinally for the greater portion of the length of the arms and projecting substantially at right angles to the rear faces thereof. Also mounted upon the shaft 4 and arranged to slide longitudinally thereof is an operating collar or hub 5, the movements of which control the operation of the clutch-shoes. This hub 5 is formed adjacent its rear end with an annular groove 6, adapted to receive any well-known and suitable means by which the hub may be reciprocated on the shaft to operate the clutch, and within this hub at its forward portion is a chamber 7, which receives and sets over the hub $4^a$ when the elements are in position to couple the shafts, the hub being also formed at its front edge with rearwardly-extending oppositely-located recesses $7^a$, within which the arms 8 9 and their strengtheningflanges project when the hub 5 sets over the sleeve $4^a$. Formed on opposite sides of this hub 5 are pairs or sets of bifurcated lugs or ears 18 and 19, the function and purpose of which will be more fully set forth hereinafter.

Slidably disposed upon the arms 8 and 9 are clutch-block carriers 10 and 11, respectively, comprising plates arranged in a plane transverse to the line of the shafts and formed at their lower edge portions with forwardly-projecting flanges $10^a$ $11^a$. These plates, constituting the clutch-block carriers, are secured in position upon the arms 8 and 9 by means of plates or keepers 12, which set over the said arms and are bolted at their end portions to the plates 10 11, a sufficient distance being left between the keepers and the block-carriers to permit of an easy movement of the carriers on the arms when operated as hereinafter described to make or break operative connection between the shafts. Formed upon the rear faces of the plates or keepers 12 and adjacent the opposite ends thereof are bifurcated lugs 14 15, in which are pivotally mounted the ends of connecting-rods 16 and 17, the opposite ends of which are pivotally connected to the ears or lugs 18 and 19 on the hub 5.

It will be seen from the above description that when the hub 5 is moved toward the end of the shaft 4 that through the medium of the connecting-rods 16 17, connected thereto and to the shoe-carriers, the said carriers will be moved outwardly toward the ends of the arms 8 and 9 and that a reverse movement of the hub 5 will draw the carriers inwardly toward the hub $4^a$. In order to determine the distance the carriers 10 11 are to move when thrown outwardly, the rods 16 17 are each made in two sections connected by means of a turnbuckle $16^a$ $17^a$, by means of which the length of the rods may be adjusted in a manner which is obvious without further description.

Mounted upon the carriers 10 11 are segment-shaped clutch-shoes 20 21, the straight edges of which rest upon the flanges $10^a$ $11^a$ of the carriers and the curved faces of which are coincident with the curve of the inner face of the flange 3, with which they engage when the hub 5 is moved toward the driving-shaft to couple the shafts. These shoes are held in position upon the carriers by means of bolts 22, which are projected upwardly through the flanges $10^a$ $11^a$ and engage the straight edges of the shoes which, as before mentioned, rest upon the said flanges.

The operation of the invention is as follows: The parts being arranged as described and assuming that the clutch is in the position shown in Fig. 3, so that the shafts are disconnected, the operating devices (not shown) are manipulated to slide the hub 5 forwardly or toward the driving-shaft 1, which serves to slide the shoe-carriers 10 11 toward the free ends of the arms 8 and 9, the movement continuing until the shoes 20 21 on the carriers are forced into engagement with the inner face of the flange 3, so that the shafts 1 and 4 are coupled to transmit motion from the former to the latter. In this position it will be seen that the elements assume positions shown in Figs. 1 and 2, the hub 5 being set over the hub $4^a$ and the arms 8 and 9 extending into the recesses $7^a$ $7^a$. To disconnect the parts, the hub 5 is thrown rearwardly on the shaft 4 and pulls the shoes toward the hub $4^a$, whereby they are drawn out of engagement with the flange 3, and the shafts 1 and 4 may have movement independently of each other.

While I have stated throughout the above description that the clutch elements are mounted on a driven shaft and the wheel 2 on a driving-shaft, it is obvious that this arrangement may be reversed without departing from the gist of the invention.

Having thus described my invention, what I claim, and desire to secure by Letters Patent, is—

In a clutch, the combination with longitudinally-alining shafts independently moved with relation to each other, of a wheel fixedly secured on one of the shafts to rotate therewith and having a peripheral flange, a sleeve rigidly secured on the opposite shaft and provided with radial arms rectangular in cross-section, segmental carriers coöperating with the opposite extremities of the said radial arms and having keepers slidable over said arms, the keepers having an angular contour corresponding to the arms and the carriers each provided with forwardly - projecting flanges with segmental shoes thereon, a collar slidable on the shaft to which the said hub is secured and formed with a chamber extending longitudinally thereinto to receive and set over said hub, the part of the collar having the chamber therein having opposite slots to receive the portions of the arms adjacent to the hub, and pairs of adjustable connecting devices movably attached to the upper and lower portions of the collar and to the carriers, the connecting devices being attached to the carrier on opposite sides of the said arms.

In testimony whereof I affix my signature in presence of two witnesses.

JACOB C. CRABILL.

Witnesses:
E. W. KEENAN,
DAVID J. HUMMER.